United States Patent
Ünal et al.

(10) Patent No.: US 11,167,708 B2
(45) Date of Patent: Nov. 9, 2021

(54) BUMPER BEAM AND PRODUCTION METHOD THEREOF

(71) Applicant: BOĞAZIÇI ÜNIVERSITESI, Besiktas/Istanbul (TR)

(72) Inventors: Mehmet Akif Ünal, Atasehir/Istanbul (TR); Ferhunde Sedef Karagül, Atasehir/Istanbul (TR); Merve Ersoy, Atasehir/Istanbul (TR); Nuri Bülent Ersoy, Istanbul (TR); Semih Çakil, Akyurt/Ankara (TR); Ayşe Meriç Kartal Berker, Kadikoy/Istanbul (TR); Yunus Emre Özçelik, Atasehir/Istanbul (TR)

(*) Notice: Subject to any disclaimer, the term of this patent is extended or adjusted under 35 U.S.C. 154(b) by 2 days.

(21) Appl. No.: 16/762,313

(22) PCT Filed: Nov. 8, 2018

(86) PCT No.: PCT/TR2018/050668
§ 371 (c)(1),
(2) Date: May 7, 2020

(87) PCT Pub. No.: WO2019/212432
PCT Pub. Date: Nov. 7, 2019

(65) Prior Publication Data
US 2021/0039574 A1    Feb. 11, 2021

(30) Foreign Application Priority Data
Nov. 8, 2017   (TR) ................. 2017/17563

(51) Int. Cl.
*B60R 19/18*    (2006.01)
*B60R 19/03*    (2006.01)
*B60R 19/02*    (2006.01)

(52) U.S. Cl.
CPC .............. *B60R 19/18* (2013.01); *B60R 19/02* (2013.01); *B60R 19/03* (2013.01); *B60R 2019/1833* (2013.01)

(58) Field of Classification Search
CPC ....... B60R 19/02; B60R 19/023; B60R 19/03; B60R 19/18
(Continued)

(56) References Cited

U.S. PATENT DOCUMENTS 4,671,550 A  *  6/1987  Molnar ................... B60R 19/18
                                                    293/102
6,349,521 B1     2/2002  McKeon et al.
(Continued)

FOREIGN PATENT DOCUMENTS

EP       1 347 892 B1      1/2005
KR     10-2010-0104457 A    9/2010
(Continued)

OTHER PUBLICATIONS

International Search Report and Written Opinion of the International Searching Authority for International Patent Application No. PCT/TR2018/050668 dated Nov. 14, 2019, 13 pages.

*Primary Examiner* — Jason S Daniels
(74) *Attorney, Agent, or Firm* — Merchant & Gould P.C.

(57) ABSTRACT

The invention is related to an energy absorber which is suitable to be mounted into a bumper having metal parts and is produce from weight reduced composite material, characterized in that it comprises at least two external curvatures forming the front undulating surface, an internal curvature in connection with said external curvatures, at least a rear surface, two side surfaces, a bumper beam made of composite material having an inner support that forms three grooves between the external surfaces, the internal surface, the two side surfaces and rear surface, at least two crash boxes which absorb the energy transferred from the bumper (Continued)

beam during a collision, a bumper beam coupling part which enables to fix the bumper beam with each crash box, and a chassis coupling part which enables to fix each crash box to the vehicle chassis.

9 Claims, 5 Drawing Sheets

(58) Field of Classification Search
USPC .................................................. 293/120, 122
See application file for complete search history.

(56) References Cited

U.S. PATENT DOCUMENTS

| | | | |
|---|---|---|---|
| 2005/0082852 A1* | 4/2005 | Corscadden | B60R 19/18 293/120 |
| 2005/0285414 A1 | 12/2005 | Liu et al. | |
| 2015/0129116 A1* | 5/2015 | Richeton | B60R 19/12 156/180 |
| 2016/0159300 A1* | 6/2016 | Matecki | B60R 19/18 293/120 |
| 2016/0167609 A1* | 6/2016 | Corwin | B60R 19/18 293/120 |

FOREIGN PATENT DOCUMENTS

| | | |
|---|---|---|
| TR | 2012/11373 A | 4/2014 |
| WO | 2015/079876 A | 6/2015 |
| WO | 2016/094300 A2 | 6/2016 |
| WO | 2017/007411 A1 | 1/2017 |

* cited by examiner

BUMPER BEAM AND PRODUCTION METHOD THEREOF

CROSS-REFERENCE TO RELATED APPLICATIONS

This application is a National Stage Application of PCT/TR2018/050,668, filed 8 Nov. 2018, which claims the benefit of Ser. No. 2017/17563, filed 8 Nov. 2017 in Turkey, and which applications are incorporated herein by reference. To the extent appropriate, a claim of priority is made to each of the above-disclosed applications.

TECHNICAL FIELD

The invention is related to a bumper beam, crash box and connection apparatuses located at the inner section of the bumpers which provide the absorption of some of the energy at the time of collision.

The invention is related to a bumper beam that has been produced from composite material, particularly carbon fibre reinforced composite material, whose weight has been reduced and whose energy absorbing ability has been increased.

PRIOR ART

Traditionally the vehicle bumpers in the automotive sector have been produced from metal materials. Due to excessive weight being an important factor in relation to fuel consumption and emission values and due to the aims of producing environmentally friendly vehicles, automobile producers have been trying to find a way to reduce weight in vehicles.

Nowadays active and/or passive safety systems are being used in the automotive sector in order to reduce damage in case of accidents. Passive measures are usually taken by using parts that enable to absorb energy during impact.

In the recent years several parts of vehicles have been started to be produced from plastic material in order to reduce weight of vehicles and increase safety precautions. The parts in which plastic is used most frequently used in automobiles are bumpers. Not only does plastic provide advantages at the time of collision as it is flexible, but it also reduces the unit prices of spare parts as it is cheaper to produce.

At the time of collision the safety of life and property can be increased up to an optimum level by absorbing kinetic energy in the best way possible. Bumper beams and crash box configurations have been started to be used between plastic bumpers and the chassis of the automobile, which prevent vehicles from being damaged and passengers from being injured by enabling some of the energy to be absorbed at the time of collision.

During a collision plastic bumpers are flexed or broken, depending on the speed of the collision all or a part of the impact is absorbed by the bumper beam and crash box and the damage of the vehicle chassis and the vehicle body is prevented.

The bumper beams of modern vehicles need to be impact resistant, need to have high energy absorbing ability, and need to be lightweight and flexible in design. Most of the bumper beams used nowadays is produced from aluminium material, preferably by extrusion.

In the Turkish Patent and Trademark Office with the publication number TR201211373a type of bumper beam and crash box is described. Said crash box has a certain configuration for the crash box energy to be absorbed and is formed of aluminium material. The parts are produced by extrusion.

In the South Korean Patent Office document with the publication number KR20100104457 a type of a bumper beam whose weight has been reduced is described which has been produced from fibre glass reinforced composite material. In the related invention, especially in the "C" form a bumper beam is described wherein the energy absorbing ability of said bumper beam is provided by means of honeycomb layers. By means of said configuration the impact absorbing features have been increased and the weight has been reduced.

In the South Korean Patent Office document with the publication number KR20100104457 a hybrid bumper beam and a tensioning pipe which is coupled therein, a connection part of said pipe and a crash box arranger is described. The bumper beam of the invention is made of fibre glass reinforced thermoplastic resin. Resistance has been increased and vibrations have been reduced by means of the tensioning pipe of the invention. Moreover said bumper beam enables significant amounts of energy absorption. Said product configuration is different from the bumper beam of the invention.

A type of a bumper beam configuration is described in the European Patent Office document with the publication number EP1347892. The beam is produced of a profile material. Said configuration cannot carry out effective absorption.

In the Turkish Patent and Trademark Office document with the publication number, a type of crash box is described which is telescopic, with an additional axis, and which is produced such that it has a different length and wall thickness. Said configuration is produced from metal material or from composite material. Said configuration may have different geometric shapes. However it does not provide sufficient efficiency in terms of product weight.

In the WIPO patent document with the publication number WO2016094300a type of bumper beam that has three grooves, that has been produced from composite material by means of pultrusion is described. Said grooves are formed as square/rectangle shape and the collision surface is flat shaped. Said bumper beam cannot provide sufficient energy absorption during collision.

Finally all of the problems mentioned above, has necessitated innovations to be carried out in the related field.

OBJECTIVE OF THE INVENTION

The present invention necessitates the elimination of the abovementioned problems and to provide technical innovation in the related field.

The main objective of the invention is to provide a bumper beam structure whose absorption ability per unit weight has been developed, whose weight has been reduced and the production costs thereof have been reduced.

Another objective of the invention is to improve the specific energy absorbance performance of the crash boxes and bumper beams that are used in vehicles.

Another objective of the invention is to increase safety.

Another objective of the invention is to ensure that the damage caused to the vehicle body and the vehicle chassis during a collision is reduced to minimum.

Another objective of the invention is to ensure that the weight of the energy absorbing parts used in vehicles is reduced.

Another objective of the invention is to provide fuel saving by reducing the total weight of the vehicle and depending on this to ensure the improvement of emission values.

BRIEF DESCRIPTION OF THE INVENTION

The present invention is related to a bumper beam that is produced from composite material which has high energy absorbing ability and the production method thereof in order to carry out all of the aims that can be construed from the invention mentioned above and the detailed descriptions below.

The invention is related to an energy absorber which is suitable to be mounted inside the bumper which is constituted from weight reduced composite or metal parts, characterized in that it comprises at least two external curvatures which form a front undulating surface, an internal curvature that is connected with the external curvatures, at least one rear surface, a bumper beam produced of composite material which comprises an inner support that forms three grooves between the external surfaces and the internal surface having two side surfaces and a rear surface, at least two crash boxes which provides energy absorption that is transferred from the bumper beam at the moment of collision, a bumper beam coupling part which enables the fixing of the bumper beam to each crash box, and a chassis coupling part which enables the coupling each crash box to the vehicle chassis.

The invention is related to a bumper beam having high energy absorbing ability which is produced from composite material and production method thereof, characterized in that it is produced by the pultrusion method using plastic resin and continuously weaved fibre reinforcement, comprising at least two external curvatures forming an undulating front surface, an internal curvature connected to said external curvatures, at least a rear surface, two side surfaces, and a support which forms three grooves between the two side surfaces, the rear surface, the external curvatures and the internal curvature.

In another preferred embodiment of the invention, the bumper beam and the crash box is made of carbon fibre reinforced composite material.

In another preferred embodiment of the invention, the bumper beam and crash box is made of thermoplastic resin composite material.

In another preferred embodiment of the invention, the bumper beam and crash box is made of thermoset resin composite material.

In another preferred embodiment of the invention, the bumper beam made of metal material comprises a coupling part and chassis coupling part.

In another preferred embodiment of the invention, the bumper beam made of aluminium material comprises a coupling part and a chassis coupling part.

In another preferred embodiment of the invention, the bumper beam is made of fibre glass reinforced composite material.

In another preferred embodiment of the invention, the bumper beam is made of composite material having aramid reinforced fibre.

In another preferred embodiment of the invention, the bumper beam is made of Kevlar reinforced fibre composite material.

In another preferred embodiment of the invention, the bumper beam is made of a multi layer reinforced fibre composite material.

In another preferred embodiment of the invention the production of the bumper beam can be by any method that can be used for fibre reinforced/supported plastic composites, as an alternative to the pultrusion method. The resin which forms the matrix material can be thermoplastic, thermoset and/or any kind of combination of plastic-rubber. Moreover the fibre reinforcement can be continuous, chopped, woven or stacked.

The sinus undulating structure of the bumper beam provides multiaxial durability and besides this it is more successful in comparison to the alternative types in absorbing energy or transferring energy to crash boxes.

The protection scope of the invention has been defined in the claims and it cannot be limited to the illustrations provided in the brief and detailed description herein, which are given to exemplify the invention. It is obvious that a person skilled in the art can carry out similar embodiments under the light of the descriptions given above without deviating from the scope of the invention.

DESCRIBING THE REFERENCE NUMBERS OF THE FIGURES

10. Energy absorber
20. Bumper beam
    201. External curvature
    202. Internal curvature
    203. Side surface
    204. Inner support
    205. Rear surface
    21. Groove
30. Crash box
    301. Absorbing curve
    302. Absorbing ridge
    303. Flat surface
    304. External curve
    31. Bumper beam coupling part
    32. Chassis coupling part
    321. Part mounting curve
x. Crash direction
y. Transfer direction of the crash energy

DETAILED DESCRIPTION OF THE INVENTION

In this detailed description the energy absorber and production method thereof, subject to the invention has been described by means of examples in order to further illustrate the invention, which do not have any kind of limiting effect on the invention.

The subject of the invention is related to a bumper beam (20) and production method thereof which is formed of a bumper beam (20), crash box (30) and coupling parts, wherein the beam is coupled to the vehicle chassis that is placed between the body of the vehicle and the vehicle bumper and enables to reduce the energy by absorbing it during a collision.

Figure 1:
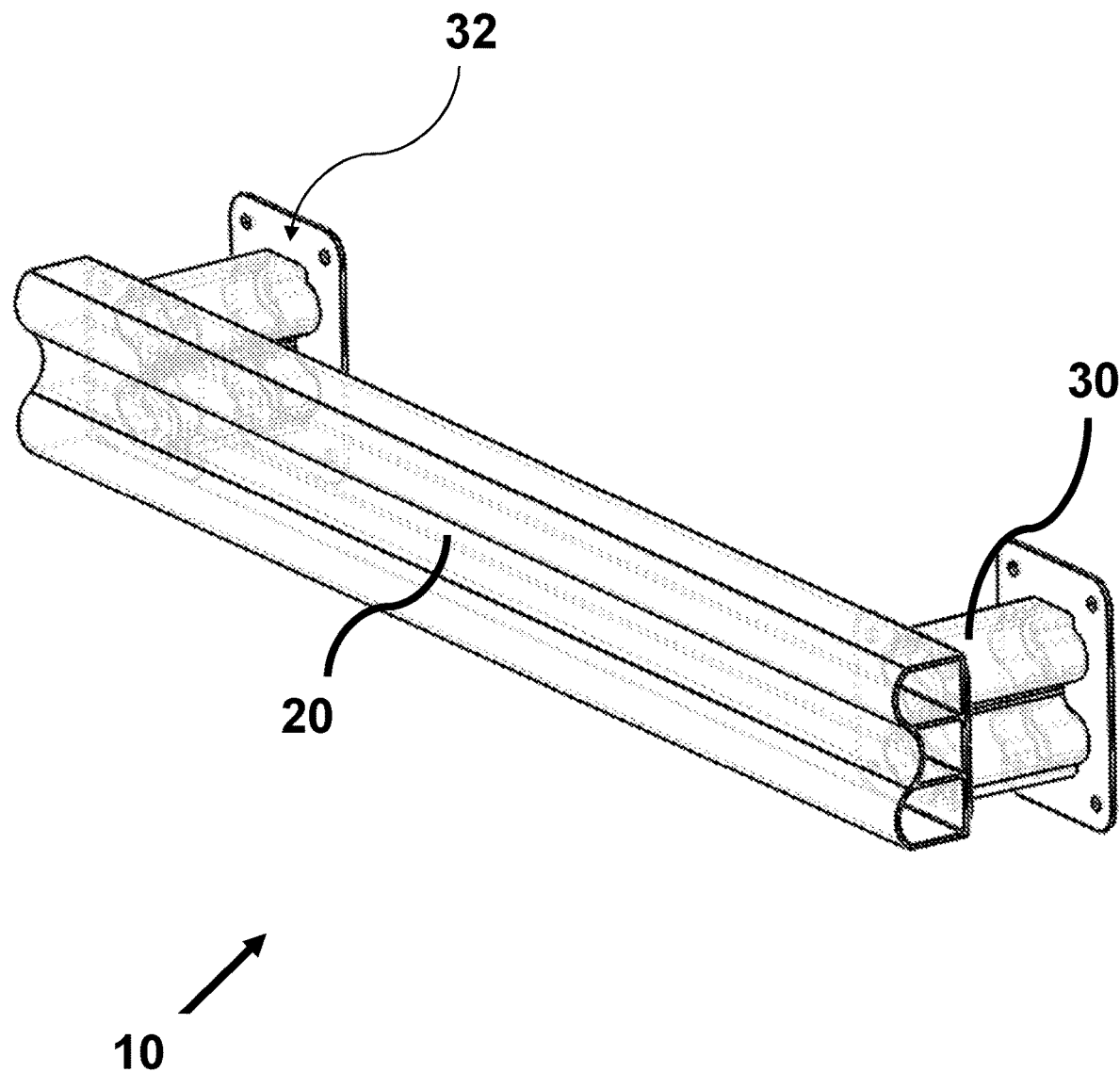
FIG. 1 is the perspective view of the invention.

In FIG. 1, the isometric view of the energy absorber (10) constituted by the bumper beam (20), crash box (30) and the bumper beam coupling part (31) which forms the main body connections and the chassis coupling part (32) has been given.

The bumper beam (20) made of composite material comprising at least two external curvatures (201) forming the front undulating surface, an internal curvature (202) in connection with said external curvatures (201), at least a rear surface (205), two side surfaces (203), an inner support (204) that forms three grooves (21) between the external surfaces (201), the internal surface (205), the two side surfaces (203) and rear surface (205), is characterized in that it comprises at least two crash boxes (30) which absorb the energy transferred from the bumper beam (20) during a collision, a bumper beam coupling part (31) which enables to fix the bumper beam (20) and each crash box (30), and a chassis coupling part (32) which enables to fix each crash box (30) to the vehicle chassis.

The invention is characterized in that it is produced by a pultrusion method using continuously weaved fibre reinforcement and plastic resin, comprising at least two external curvatures (201) that form a front undulating surface, an internal curvature (202) that is connected to the external curvatures (201), at least a rear surface (205), two side surfaces (203) and an inner support (204) which forms three grooves (21) between said two side surfaces (203), rear surface (205) external curvatures (201) and internal curvature (202).

Figure 2:
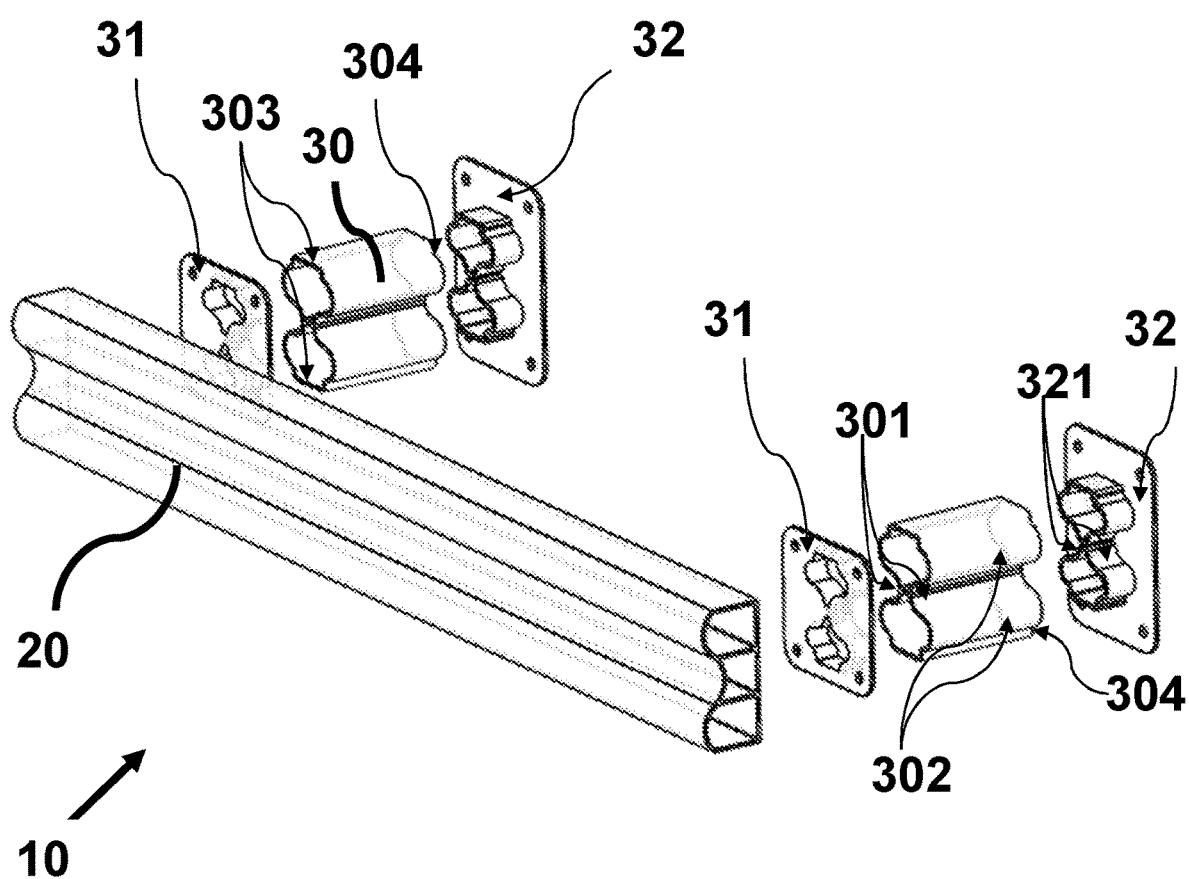
FIG. 2 is the exploded perspective view of the invention.

In FIG. 2 the exploded isometric view of the bumper beam (20), the crash box (30) and the bumper beam coupling part (31) and the chassis coupling part (32) of said energy absorber has been given. The crash box (30) of the invention comprises an absorbing ridge (302) and absorbing curves (301) at the joining sections of said absorbing ridges (302). At the bottom and top section of the crash box, a flat surface (303) form is provided as it can be seen in FIG. 2. An external curve (304) that is concave is located at the joining section of said flat surface (303) and the absorbing ridge (302).

In the preferred embodiment of the invention said crash box (30) has been produced from fibre reinforced composite material. In a preferred embodiment of the invention it is produced from carbon fibre reinforced composite material.

In a preferred embodiment of the invention said crash box (30) can be produced from fibre glass, aramid fibre or Kevlar fibre. Said fibres can be used as continuous, chopped, woven or stacked.

In the embodiments of the crash box (30) that are produced from composite material, either thermoplastic or thermoset resin is used.

In a preferred embodiment of the invention said crash box (30) has been produced from metal material.

Figure 3:
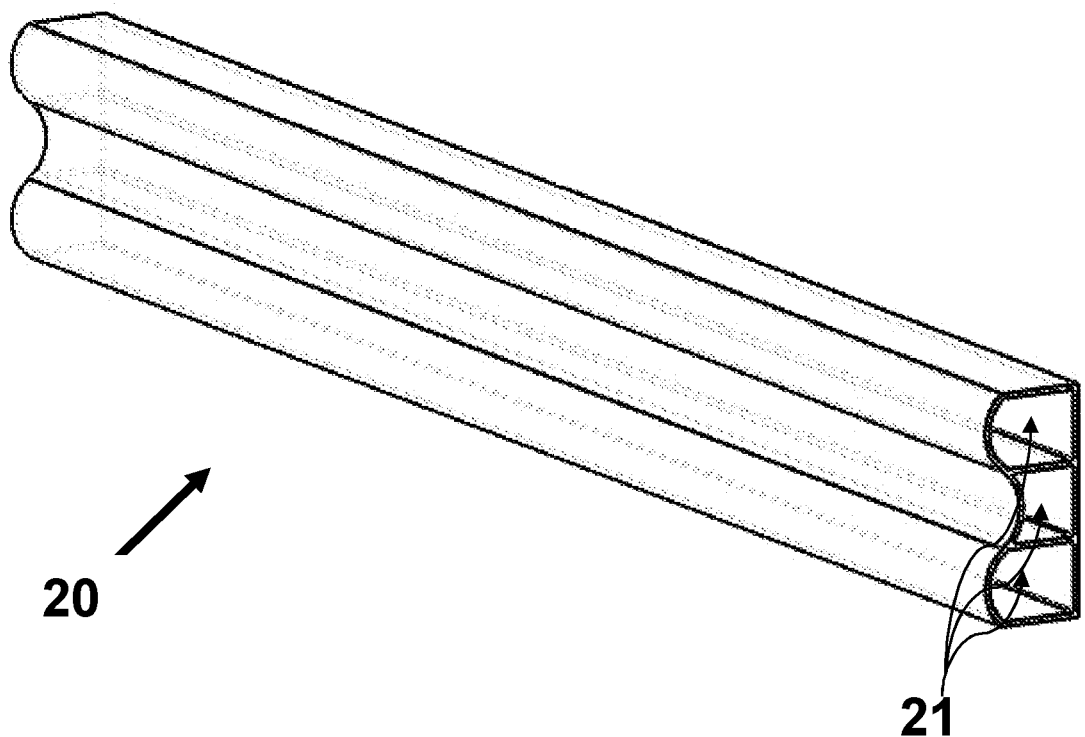
FIG. 3A is the perspective view of the bumper beam of the invention.
FIG. 3B is the section view of the bumper beam of the invention.
Figure 3:
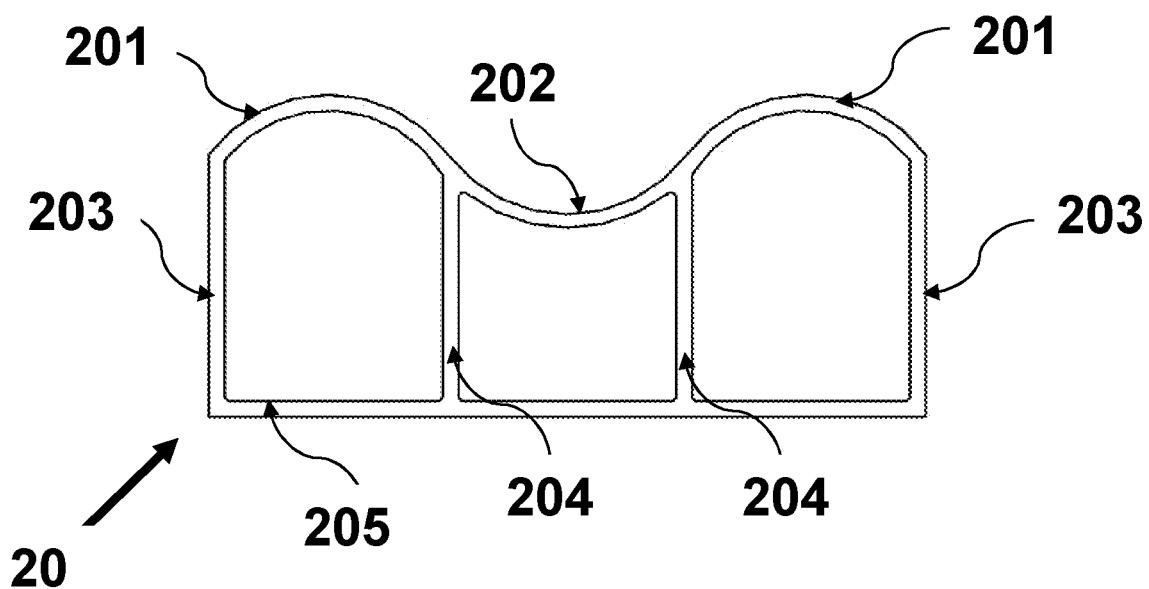

In FIG. 3A, the perspective view of the bumper beam (20) of the invention and in FIG. 3B, the section view of the bumper beam (20) of the invention has been given. Said bumper beam (20) has at least three grooves (21) in its inner section. Said grooves (21) are formed by means of the inner supports (204) of the bumper beam (20). The bumper beam's (20) front section is in sinusoidal form. The detail of said form has been given in FIG. 3B. As it can be seen in the figure, a sinusoidal form is obtained by means of the internal curvature (202) that is placed between the two external curvatures (201) at the front section. In other preferred embodiments of the invention, the internal curvature (201) and the external curvature (202) numbers can differ and depending on this the continuation of the form can be provided. The rear section of the bumper beam (20) comprises a rear surface (205) shape tow which the bumper beam coupling part (31) is mounted. The side surfaces (203) form the edges of the bumper beam (20). Said side surfaces (203) are located at the top and bottom sections of the bumper beam (20) that is mounted onto the vehicle.

Figure 5:
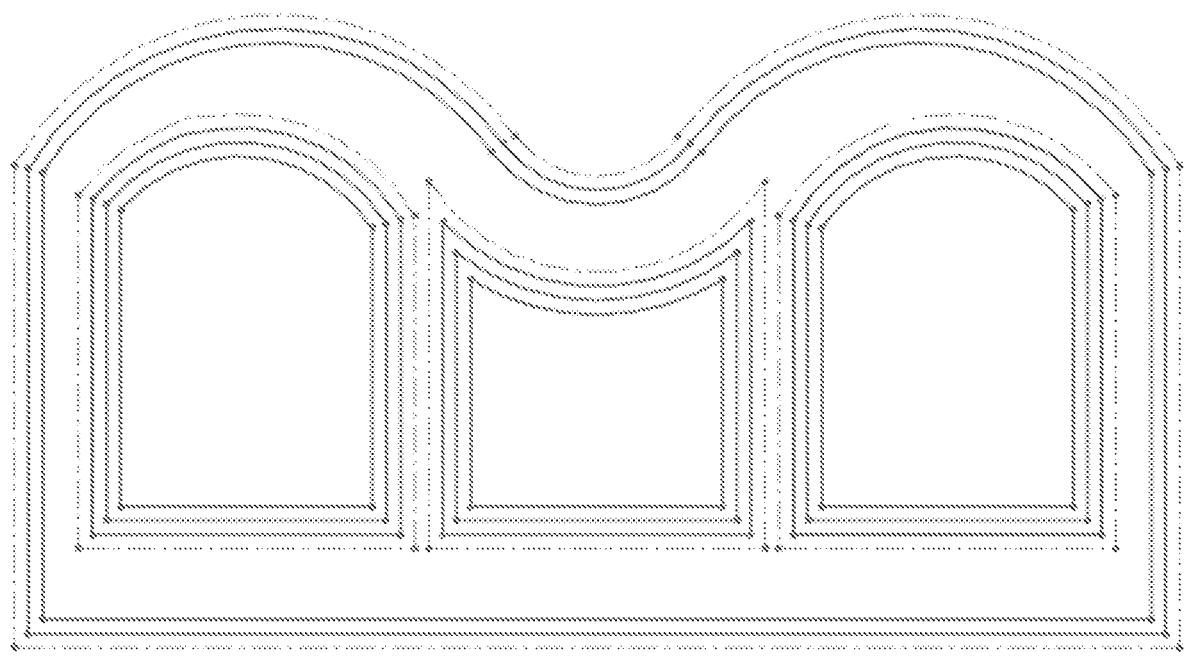
FIG. 5 is the section view showing the continuous winding during the production of the bumper beam.

The bumper beam (20) is produced preferably by the pultrusion method made of fibre reinforced composite material. In FIG. 5 the fibre weaved around the bumper beam (20) has been illustrated. The fibre is weaved continuously by means of the pultrusion method. Matrix material is formed by means of thermoplastic or thermoset resin and the production of the bumper beam (20) is completed. The fibre is weaved at a single direction during said winding process and preferably carbon fibre is used.

In another preferred embodiment of the invention fibre is weaved in varying angles.

In another preferred embodiment of the invention, a reinforcement material is formed using fibre glass, aramid fibre, or Kevlar fibre or a combination of said fibres. In other embodiments, said bumper beam (20) can be obtained by using continuous, chopped, woven or stacked fibre supports.

As it can be seen in FIG. 2, the bumper beam (20) and the crash box (30) are fixed to each other by means of a bumper beam coupling part (31). The mounting of the crash box (30) with said bumper beam coupling part (31) is carried out by means of form fitting of the parts with each other. Said bumper beam coupling part (31) is produced from metal material, preferably from aluminium.

In another preferred embodiment of the invention, the mounting of the crash box (30) with said bumper beam coupling part (31) can be carried out by close fitting of the parts to each other.

The crash box (30) is fixed to the vehicle chassis by means of the chassis coupling part (32). The chassis coupling part (32) mentioned has a similar design to the surface form of the crash box (30). The part of the crash box is mounted to the structure formed by the absorbing ridge (302) and the absorbing curve (301) via the mounting curve (321). The mounting to the crash box (30) can be carried out by form fitting of the parts. Said chassis coupling part (32) is fixed to the vehicle chassis preferably using a bolt by means of the mounting slots of said coupling part. By this means the bumper beam (20) and crash box (30) which form the energy absorber (10) are mounted onto the vehicle. Said chassis coupling part (32) is produced from metal material, preferably from aluminium.

In another preferred embodiment of the invention the chassis coupling part (32) and the crash box (30) can be obtained by adhering or close fitting of the parts to each other.

The bumper beam coupling parts (31) and the chassis coupling parts (32) of the invention are produced by means of the machining method and they are resistant against the static loads that the bumper may be exposed to during a collision.

Figure 4:
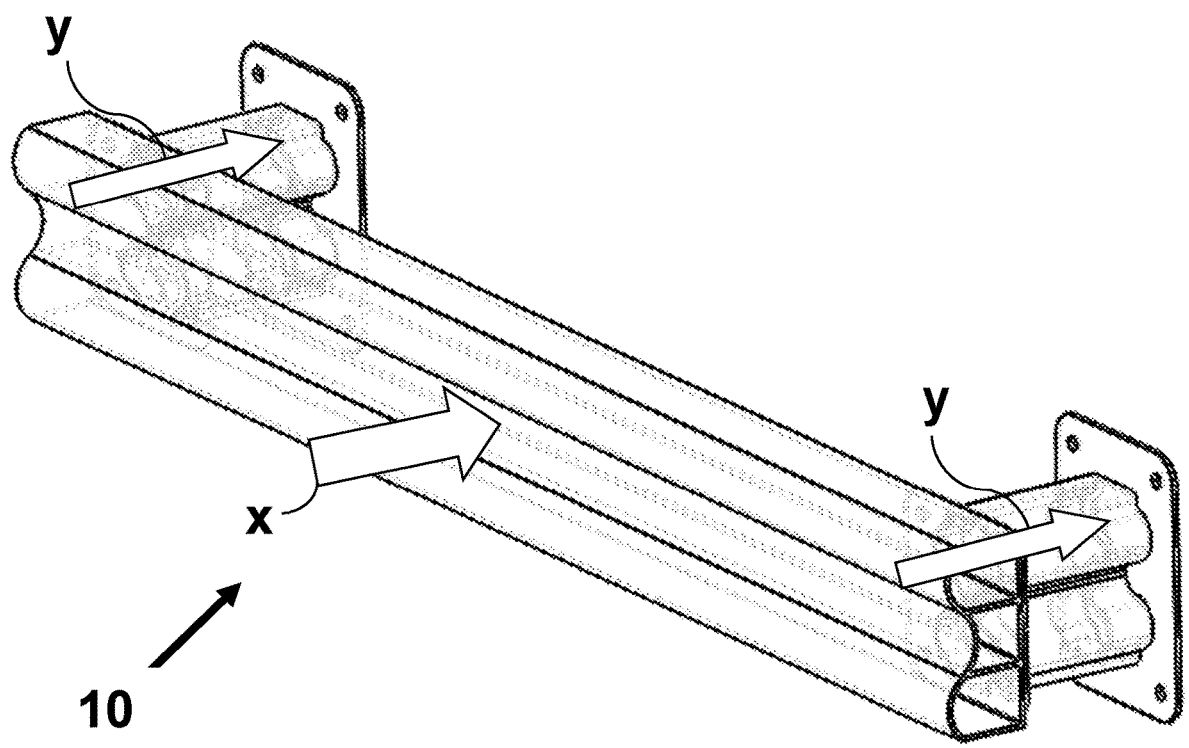
FIG. 4 is the perspective view of the invention which shows the direction of forces applied onto the bumper beam during collision.

In FIG. 4, the transfer direction (y) of the crash energy to the crash boxes (30) via the bumper beam (20) at the direction of the collision (x) has been shown. At the time of the collision the force received at the crash direction (x) by the bumper beam (20) is transferred to the two crash boxes (30). By means of the special shape of the crash boxes, energy is absorbed. The direction of a part of the crash force (x) received by the bumper beam (20) can be deviated by means of the three grooved (21) sinusoidal form and the energy is absorbed in a stepped manner with the crushing of the bumper beam (20).

The energy absorber (10) which is a component formed of a bumper beam (20) and crash boxes (30) can be found by measuring the load formed during the impact to the heavy beam in the pendulum device and by calculating the area remaining below this force-displacement curve as energy, and by dividing this energy value to the weight of the part. The advantage energy transfer of the energy absorber (10) can be determined by a three point flexural test by applying force by means of hydraulic pistons to the frontal mid section of the part.

The invention claimed is:

1. A bumper beam having high energy absorbing ability comprising a composite material, characterized in that it is produced by a pultrusion method using continuously weaved fibre reinforcement and plastic resin, the bumper beam comprising at least two external curvatures that form a front undulating surface, an internal curvature that is connected to the external curvatures, at least a rear surface, two side surfaces and an inner support which forms three grooves between said two side surfaces, rear surface, external curvatures and internal curvature.

2. The bumper beam according to claim 1, wherein the composite material is a carbon fibre reinforced composite material.

3. The bumper beam according to claim 1, wherein the composite material comprises thermoplastic resin.

4. The bumper beam according to claim 1, wherein the composite material comprises thermoset resin.

5. The bumper beam according to claim 1, wherein the composite material is a fibre glass reinforced composite material.

6. The bumper beam according to claim 1, wherein the composite material is an aramid reinforced fibre composite material.

7. The bumper beam according to claim 1, wherein the composite material is a Kevlar reinforced fibre composite material.

8. The bumper beam according to claim 1, wherein the composite material is a multi layer reinforced fibre composite material.

9. The bumper beam according to claim 1, wherein the composite material is a multi layer reinforced carbon fibre composite material.

\* \* \* \* \*